(12) United States Patent
Dedeoglu et al.

(10) Patent No.: US 10,554,955 B2
(45) Date of Patent: Feb. 4, 2020

(54) METHOD AND APPARATUS FOR DEPTH-FILL ALGORITHM FOR LOW-COMPLEXITY STEREO VISION

(75) Inventors: Goksel Dedeoglu, Plano, TX (US); Vinay Sharma, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 1274 days.

(21) Appl. No.: 13/270,365

(22) Filed: Oct. 11, 2011

(65) Prior Publication Data

US 2012/0092458 A1 Apr. 19, 2012

Related U.S. Application Data

(60) Provisional application No. 61/391,937, filed on Oct. 11, 2010.

(51) Int. Cl.
*H04N 13/271* (2018.01)

(52) U.S. Cl.
CPC .............................. *H04N 13/271* (2018.05)

(58) Field of Classification Search
None
See application file for complete search history.

(56) References Cited

U.S. PATENT DOCUMENTS

| | | | |
|---|---|---|---|
| 2009/0167843 A1* | 7/2009 | Izzat et al. | 348/43 |
| 2009/0247249 A1* | 10/2009 | Hughes et al. | 463/1 |
| 2010/0208994 A1* | 8/2010 | Yao et al. | 382/173 |
| 2011/0102438 A1* | 5/2011 | Mathe et al. | 345/426 |

* cited by examiner

*Primary Examiner* — Kate H Luo
(74) *Attorney, Agent, or Firm* — Ebby Abraham; Charles A. Brill; Frank D. Cimino

(57) ABSTRACT

A method and apparatus for depth-fill algorithm for low-complexity stereo vision. The method includes utilizing right and left images of a stereo camera to estimate depth of the scene, wherein the estimated depth relates to each pixel of the image, and updating a depth model with the current depth utilizing the estimated depth of the scene.

8 Claims, 3 Drawing Sheets

METHOD AND APPARATUS FOR DEPTH-FILL ALGORITHM FOR LOW-COMPLEXITY STEREO VISION

CROSS-REFERENCE TO RELATED APPLICATIONS

This application claims benefit of U.S. provisional patent application Ser. No. 61/391,937, filed Oct. 11, 2010, which is herein incorporated by reference.

BACKGROUND OF THE INVENTION

Field of the Invention

Embodiments of the present invention generally relate to a method and apparatus for depth-fill algorithm for low-complexity stereo vision.

Description of the Related Art

We address a fundamental limitation of low-complexity stereo vision algorithms which estimate the scene depth from a pair of stereo images. The problem is that of "missing pixels", or "holes" in the depth image, where the stereo algorithm is unable to establish a point correspondence between the left and right views. This phenomenon is commonly observed in texture-less image regions, wherein local window correlations do not yield well-defined peaks in matching scores. State-of-the-art algorithms tackle this problem by imposing more constraints on the pixel matches such that the depth estimate reflects, for instance, the smoothness of 3D surfaces. Unfortunately, such global considerations increase the computational requirements tremendously, prohibiting the deployment of modern stereo algorithms on low-power embedded processors.

SUMMARY OF THE INVENTION

Embodiments of the present invention relate to a method and apparatus for depth-fill algorithm for low-complexity stereo vision. The method includes utilizing right and left images of a stereo camera to estimate depth of the image, wherein the estimated depth relates to each pixel of the image, and updating a depth model with the current depth utilizing the estimated depth of the image.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
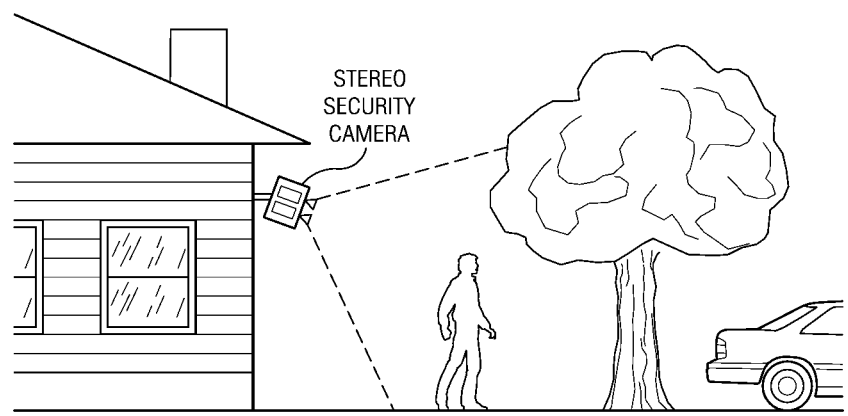
FIG. 1 is an embodiment of a stereo camera observing a scene.

FIG. 1 is an embodiment of a stereo camera observing a scene. When the stereo camera is stationary, one may deploy a temporal algorithm to address the "missing depth pixel" problem. Various events happening in the scene maybe utilized to gather information about the missing depth pixels, thus, filling-in the depth image over time.

Figure 2:
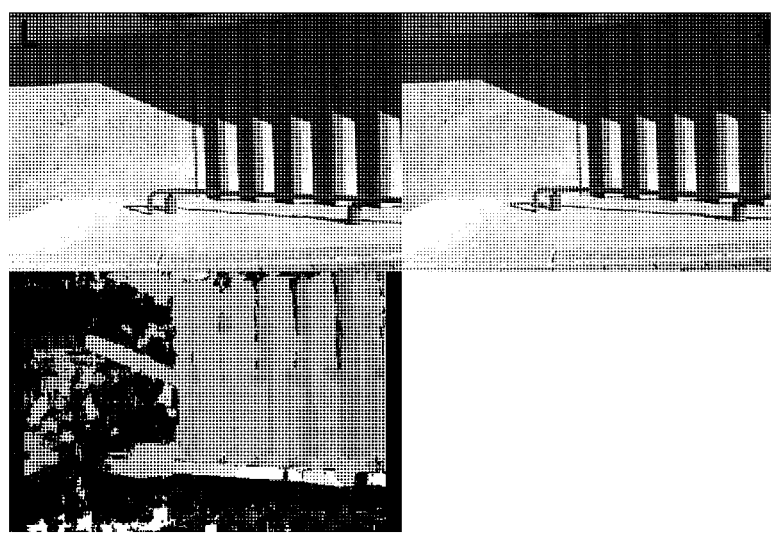
FIG. 2 is an embodiment of view from a video security camera mounted over an outdoor staircase.

FIG. 2 is an embodiment of view from a video security camera mounted over an outdoor staircase. A stereo camera captures the left & right images shown on the top, and the scene depth image produced by a low-complexity stereo algorithm is shown in false-color at the bottom. Note the prevalence of black pixels, of unknown depth, in texture-less image regions such as smooth walls and the concrete slab.

Figure 3:
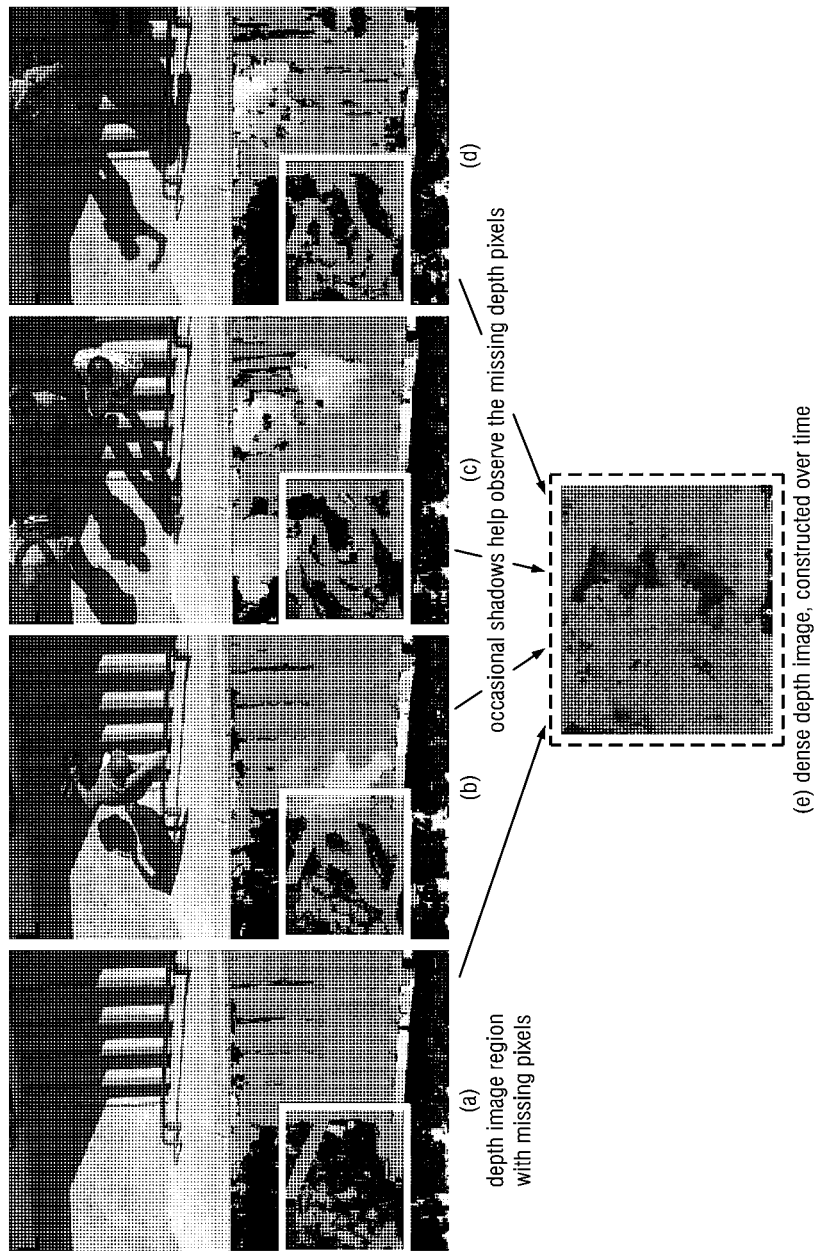
FIG. 3 is an embodiment of filled-in missing depth pixels.

FIG. 3 is an embodiment of filled-in missing depth pixels. As shown in FIG. 3, the shadows cast by occasional by-passers provide intermittent, yet, informative texture for the stereo algorithm. For instance, by keeping track of the farthest valid depth value, a dense depth image of the concrete slab can be recovered. In one embodiment, intermittent scene events are exploited to fill in the missing depth information in the scene. Observe, for instance, the shadows cast by occasional by-passers in FIG. 3.

Such visual events are helpful to stereo algorithms when they occur. As shadows sweep across the floor, the algorithm may produce many high-confidence depth measurements for the entire region. When good measurements are scattered across many frames, the farthest valid depth value on a pixel basis is tracked in order to obtain a dense depth image of the texture-less concrete slab.

In one embodiment, instead of shadows in the scene, we might observe image texture on or near a surface whose depth would otherwise be elusive to a low-complexity stereo algorithm. Imagine a scene where the ground offers no texture, but where people or vehicles move around. In regions where the people's feet touch the ground, the algorithm captures the visual contrast between the shoes/tires and the floor/road. Such depth readings maybe short in duration and sparse, but they can be accumulated over a period of time to recover the scene depth where there is most action, presumably also most interesting for visual analysis.

To determine which of the depth values corresponds to the true background depth, one may exploit the observation that, in any scene, the farthest depth value observed at a pixel corresponds to the stationary background of the scene. In one embodiment, video security may use scene depth information to detect moving objects.

In one embodiment, a background depth model maybe utilized, which may consist of the average depth measurement of all valid pixels per scan-line. Utilizing depth model improves precision, robustness, and enables robust and low-complexity depth recovery for video analytics applications. The depth-filling algorithm may assign each pixel a depth value that will be compared against novel depth measurements to decide whether a foreground object is present or not.

Figure 4:
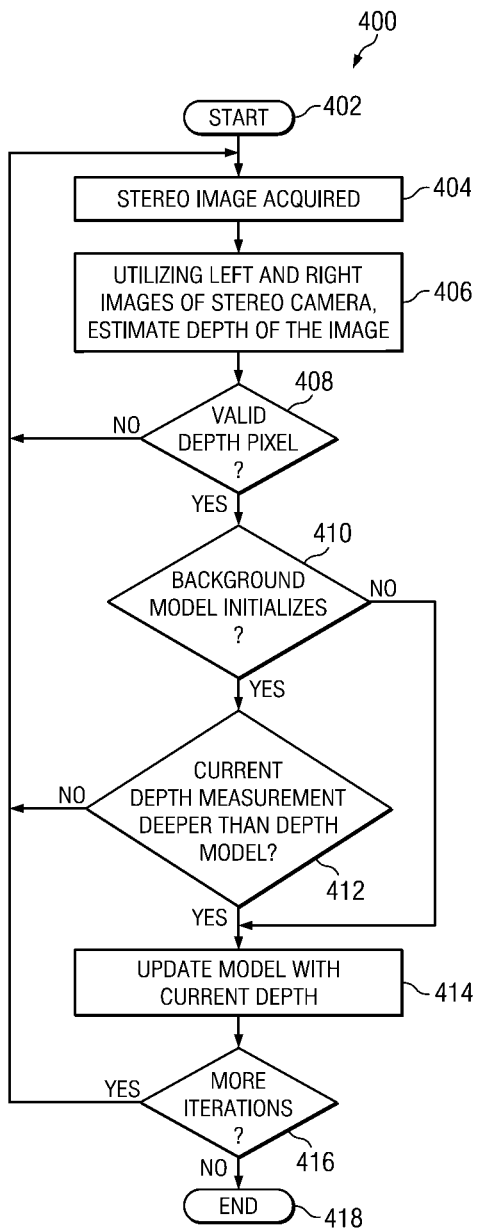
FIG. 4 is a flow diagram depicting an embodiment of a method for depth-fill algorithm for low-complexity stereo vision.

FIG. 4 is a flow diagram depicting an embodiment of a method 400 for depth-fill algorithm for low-complexity stereo vision. The method 400 starts at step 402 and proceeds to step 404. In step 404, the method 400 acquires a stereo image. In step 406, the method 400 utilizes the acquired right and left images of the stereo camera to estimate depth of the image. At step 408, the method 400 determines if the depth pixel is valid. If the depth pixel is not valid, the method 400 proceeds to step 404; otherwise, the method 400 proceeds to step 410. At step 410, the method 400 determines if the background model is initialized. If the depth pixel is not initialized, the method 400 proceeds to step 414; otherwise, the method 400 proceeds to step 412. At step 412, the method 400 determines if the current depth measurement is deeper than the depth model. If the depth measurement is not deeper, the method 400 proceeds to step 404; otherwise, the method 400 proceeds to step 414. At step 414, the method 400 updates the model with the current depth. At step 416, the method 400 determines if there are more stereo frames to be processed. If so, the method 400 proceeds to step 404; otherwise, the method 400 proceeds to step 418. The method 400 ends at step 418.

While the foregoing is directed to embodiments of the present invention, other and further embodiments of the invention may be devised without departing from the basic scope thereof, and the scope thereof is determined by the claims that follow.

What is claimed is:

1. A method comprising:
    obtaining a depth image based on left and right images of a stereo camera by tracking a farthest depth value for each of a plurality of pixels over a period of time, wherein obtaining the depth image includes:
    estimating a first depth value for a pixel in the depth image based on two or more previously-processed stereo frames, each of the previously-processed stereo frames including respective left and right images obtained from the stereo camera;
    estimating a second depth value for the pixel based on left and right images of a currently-processed stereo frame obtained from the stereo camera;
    determining whether the second depth value is deeper than the first depth value in the depth image; and
    updating the first depth value in the depth image with the second depth value in response to determining that the second depth value for the pixel is deeper than the first depth value for the pixel in the depth image.

2. An apparatus for low-complexity stereo vision, comprising:
    a memory;
    a processor coupled to the memory and configured to obtain a depth image based on left and right images of a stereo camera by tracking a farthest depth value on a pixel basis for each of a plurality of pixels over a plurality of stereo frames.

3. The apparatus of claim 2, wherein the processor is further configured to:
    estimate a first depth value for a pixel in the depth image based on two or more previously-processed stereo frames, each of the previously-processed stereo frames including respective left and right images obtained from the stereo camera;
    estimate a second depth value for the pixel based on left and right images of a currently-processed stereo frame obtained from the stereo camera;
    determine whether the second depth value is deeper than the first depth value in the depth image; and
    update the first depth value in the depth image with the second depth value in response to determining that the second depth value for the pixel is deeper than the first depth value for the pixel in the depth image.

4. The apparatus of claim 3, wherein the processor is further configured to initialize the depth image.

5. The apparatus of claim 4, wherein the processor is further configured to set the first depth value for the pixel in the depth image to a depth value of the pixel in a previously-processed stereo frame.

6. A non-transitory computer readable medium comprising instructions that, when executed by a processor, cause the processor to:
    estimate a first depth value for a pixel in a depth model based on two or more previously-processed stereo frames, each of the previously-processed stereo frames including respective left and right images obtained from a stereo camera;
    estimate a second depth value for the pixel based on left and right images of a currently-processed stereo frame obtained from the stereo camera;
    determine whether the second depth value is deeper than the first depth value in the depth model; and
    update the first depth value in the depth model with the second depth value in response to determining that the second depth value for the pixel is deeper than the first depth value for the pixel in the depth model.

7. The non-transitory computer readable medium of claim 6, wherein the instructions further cause the processor to initialize the depth model.

8. The non-transitory computer readable medium of claim 7, wherein the instructions that cause the processor to initialize the depth model include instructions that cause the processor to set the first depth value for the pixel in the depth model to a depth value of the pixel in a previously-processed stereo frame.

* * * * *